US008763096B1

(12) United States Patent
Hernacki et al.

(10) Patent No.: US 8,763,096 B1
(45) Date of Patent: Jun. 24, 2014

(54) METHODS AND SYSTEMS FOR MANAGING AUTHENTICATION

(75) Inventors: Brian Hernacki, San Carlos, CA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 1166 days.

(21) Appl. No.: 12/411,798

(22) Filed: Mar. 26, 2009

(51) Int. Cl.
*G06F 15/16* (2006.01)
*H04L 29/06* (2006.01)
*H04L 9/32* (2006.01)

(52) U.S. Cl.
CPC ............ *H04L 63/08* (2013.01); *H04L 63/0815* (2013.01); *H04L 63/083* (2013.01); *H04L 9/32* (2013.01)
USPC ............ 726/5; 726/2; 726/8; 726/12; 726/18; 726/21; 715/764; 707/602

(58) Field of Classification Search
CPC ... H04L 63/08; H04L 63/0815; H04L 63/083; H04L 9/32
USPC .................... 726/2, 5, 8, 12, 18, 21; 715/764; 707/602
See application file for complete search history.

(56) References Cited

U.S. PATENT DOCUMENTS

| 7,496,954 | B1 * | 2/2009 | Himawan et al. ................. 726/8 |
| 7,716,492 | B1 * | 5/2010 | Saulpaugh et al. ........... 713/185 |
| 2002/0023059 | A1 * | 2/2002 | Bari et al. ........................ 705/76 |
| 2003/0200184 | A1 * | 10/2003 | Dominguez et al. ............. 705/78 |
| 2004/0158746 | A1 * | 8/2004 | Hu et al. ........................ 713/202 |
| 2008/0301784 | A1 * | 12/2008 | Zhu et al. .......................... 726/5 |
| 2009/0119763 | A1 * | 5/2009 | Park et al. ......................... 726/8 |
| 2009/0157675 | A1 * | 6/2009 | Stellhorn et al. ................. 707/6 |
| 2010/0299721 | A1 * | 11/2010 | Awamoto ........................ 726/3 |
| 2010/0325440 | A1 * | 12/2010 | Deutschmann et al. ...... 713/183 |
| 2011/0041162 | A1 * | 2/2011 | Yoon et al. ........................ 726/4 |

\* cited by examiner

*Primary Examiner* — Harunur Rashid
(74) *Attorney, Agent, or Firm* — ALG Intellectual Property, LLC (57) ABSTRACT

A computer-implemented method for managing authentication may include identifying authentication-capabilities information of an online service. The computer-implemented method may also include identifying, within the authentication-capabilities information, a specification indicating how a remote computing agent may interact with the online service to perform an authentication function supported by the online service. The computer-implemented method may further include using the specification to interact with the online service to perform the authentication function. Various other methods, systems, and computer-readable media are also disclosed.

17 Claims, 6 Drawing Sheets

METHODS AND SYSTEMS FOR MANAGING AUTHENTICATION

BACKGROUND

Over the years, the popularity of online services, such as websites, web-based email services, and file distribution services, has grown dramatically. In addition to providing other services, online services may enable users to access a variety of information or perform a variety of tasks from connected computing devices around the world. As users begin to interact with more independent sites and services, the amount of authentication information they need to manage grows as well. In order to create, change, reset, and/or disable authentication for accounts, a user may need to remember numerous authentication secrets.

To make authentication secrets easier to remember, a user may use similar authentication secrets for numerous online services. In such situations, if one of the user's authentication secrets is compromised, the user may need to change authentication secrets for all the online services with similar authentication secrets. The user may spend a substantial amount of time resetting authentication secrets for each online service.

Some users may turn to password managers to help them manage authentication secrets. Traditional password managers may only provide limited functionality to help users manage authentication secrets. Many traditional password managers may only be able to replay authentication functions they have previously observed (e.g., form replay). Some password managers may offer additional features, such as password generation and password strength testing. However, such password managers typically cannot handle mass authentication resets and do not provide other functionality to simplify authentication management for users.

SUMMARY

As will be described in greater detail below, the instant disclosure generally relates to systems and methods for managing authentication. For example, an authentication agent may identify authentication-capabilities information for an online service. In some embodiments, the authentication-capabilities information may be information supplied by a provider of the online service. The authentication agent may identify, within the authentication-capabilities information, a specification indicating how a remote computing agent may interact with the online service to perform one or more authentication functions supported by the online service. The authentication agent may use the specification to interact with the online service to perform the one or more authentication functions.

The authentication agent may identify the authentication-capabilities information for the online service by querying the online service for the authentication-capabilities information. In response to the query, the authentication agent may receive the authentication-capabilities information from the online service. In other embodiments, identifying the authentication-capabilities information for the online service may include querying a domain-name system for a uniform-resource identifier associated with the authentication-capabilities information. The authentication agent may obtain the authentication-capabilities information from a location referenced by the uniform-resource identifier.

In some embodiments, the authentication agent may identify the specification of the authentication function within the authentication-capabilities information by decoding the authentication-capabilities information. The authentication function may include an account registration function, a login function, a password change function, a password reset function, and/or any other authentication function. In certain embodiments, the authentication-capabilities information may include an eXtensible Markup Language ("XML") document. In various embodiments, the authentication agent may offer, based on the authentication-capabilities information, one or more automated authentication functions to a user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for managing authentication. Embodiments of the instant disclosure may allow an authentication agent to automatically identify and implement online-service authentication functions. For example, an authentication agent may identify authentication-capabilities information for an online service. The authentication-capabilities information may be provided by a provider of the online service. The authentication agent may identify, within the authentication-capabilities information, a specification indicating how a remote computing agent may interact with the online service to perform one or more authentication functions supported by the online service. The authentication agent may use the specification to interact with the online service to perform the one or more authentication functions.

Figure 1:
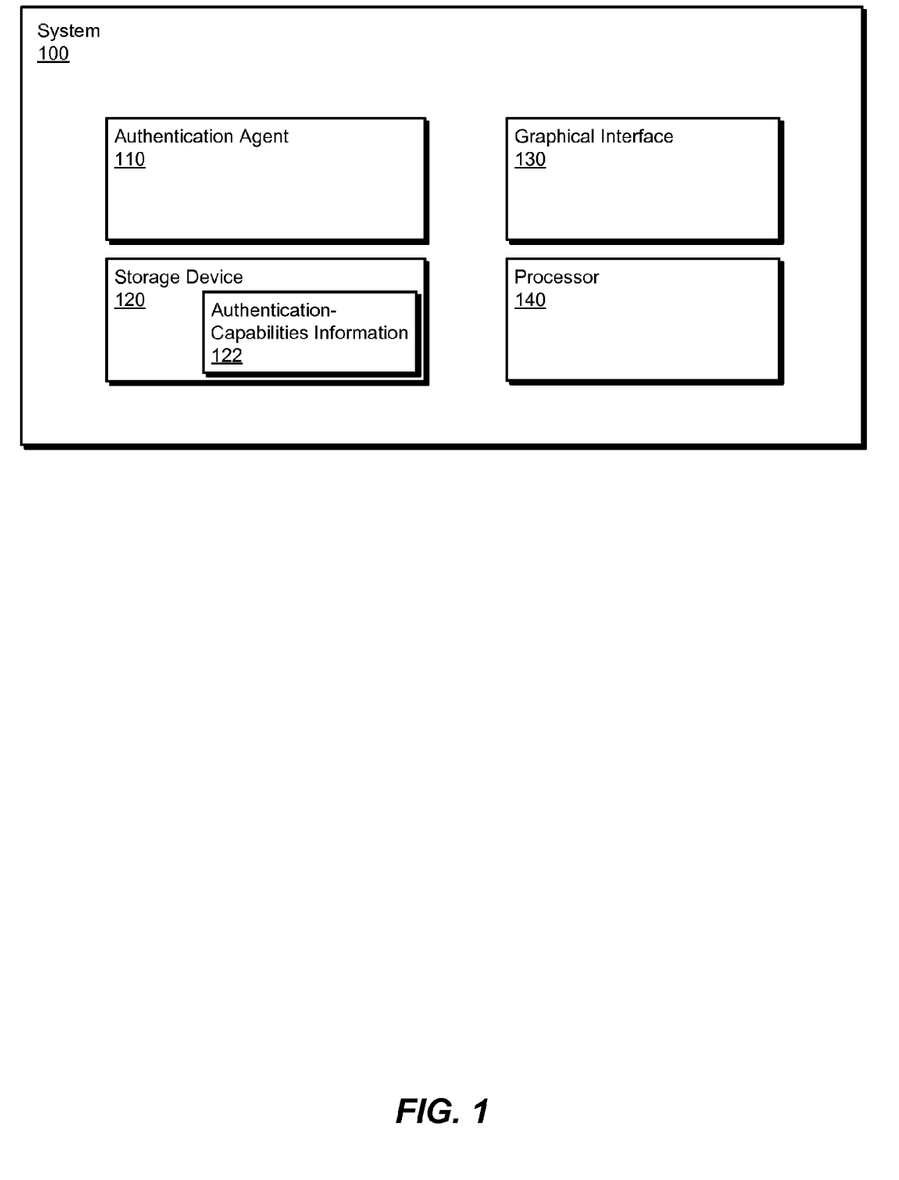
FIG. 1 is a block diagram of an exemplary system for managing authentication.
Figure 2:
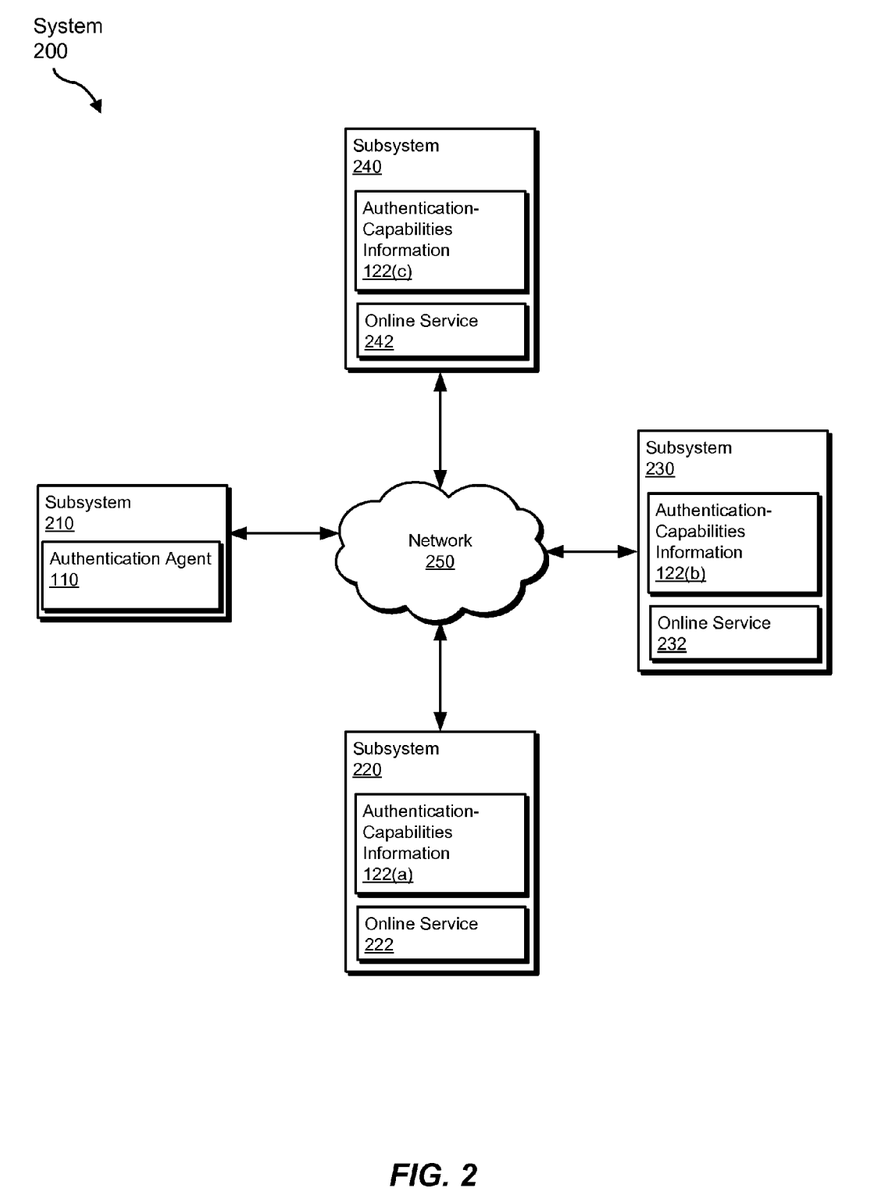
FIG. 2 is a block diagram of another exemplary system for managing authentication.

The following will provide, with reference to FIGS. 1 and 2, detailed descriptions of exemplary systems for managing authentication. Detailed descriptions of corresponding computer-implemented methods will be provided in connection with FIG. 3. A description of an exemplary authentication manager is shown in FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary authentication management system 100. System 100 may include an authentication agent 110. Authentication agent 110 may be programmed to identify authentication-capabilities information for an online service and to identify an authentication-function specification within the authentication-capabilities information. Authentication agent 110 may also be programmed to use the specification to interact with the online service to perform the authentication function.

Authentication agent 110 may represent one or more software applications or programs that, when executed by a computing device, may cause the computing device to perform one or more tasks. For example, as will be described in greater detail below, authentication agent 110 may represent one or more software modules stored and configured to run on one or more computing devices, such as the devices illustrated in FIG. 2 (e.g., subsystem 220), computing system 510 in FIG. 5, and/or portions of exemplary network architecture 600 in FIG. 6.

As illustrated in FIG. 1, exemplary system 100 may also include a storage device 120. Storage device 120 may represent any storage hardware and/or software, such as storage device 532 and/or 533 in FIG. 5. Storage device 120 may generally represent any type or form of storage device or medium capable of storing data. Storage device 120 may include authentication-capabilities information 122.

In addition to storage device 120, system 100 may include a graphical interface 130 and a processor 140. Graphical interface 130, as described in FIG. 4, may enable a user to interface with authentication agent 110. Processor 140 may include one or more microprocessors or central processing units configured to execute authentication agent 110 and/or to cause a display device to display processor 140.

FIG. 2 is a block diagram of a system 200 that provides an exemplary configuration of components of system 100. System 200 may include a subsystem 210, a subsystem 220, a subsystem 230, a subsystem 240, and a network 250. Subsystems 210, 220, 230, and/or 240 may generally represent any type or form of computing device capable of reading computer-executable instructions. Examples of computing subsystems 210, 220, 230, and/or 240 may include, without limitation, laptops, desktops, servers, cellular phones, personal digital assistants ("PDAs"), multimedia players, embedded systems, combinations of one or more of the same, exemplary computing system 510 in FIG. 5, or any other suitable computing device.

As shown in FIG. 2, subsystem 210 may include authentication agent 110. Subsystem 220 may include authentication-capabilities information 122(a) and an online service 222, subsystem 230 may include authentication-capabilities information 122(b) and an online service 232, and subsystem 240 may include authentication-capabilities information 122(c) and an online service 242. In some embodiments, subsystem 210 may be a user's computing device, and online services 222, 232, and 242 may be services to which the user subscribes.

Subsystem 210, subsystem 220, subsystem 230, and/or subsystem 240 may communicate over a network 250. Network 250 generally represents any medium or architecture capable of facilitating communication or data transfer. Examples of network 250 include, without limitation, an intranet, a wide area network ("WAN"), a local area network ("LAN"), a personal area network ("PAN"), the Internet, power line communications ("PLC"), a cellular network (e.g., a GSM network), exemplary network architecture 600 in FIG. 6, or the like. Network 250 may facilitate communication or data transfer using wireless and/or wired connections.

Figure 3:
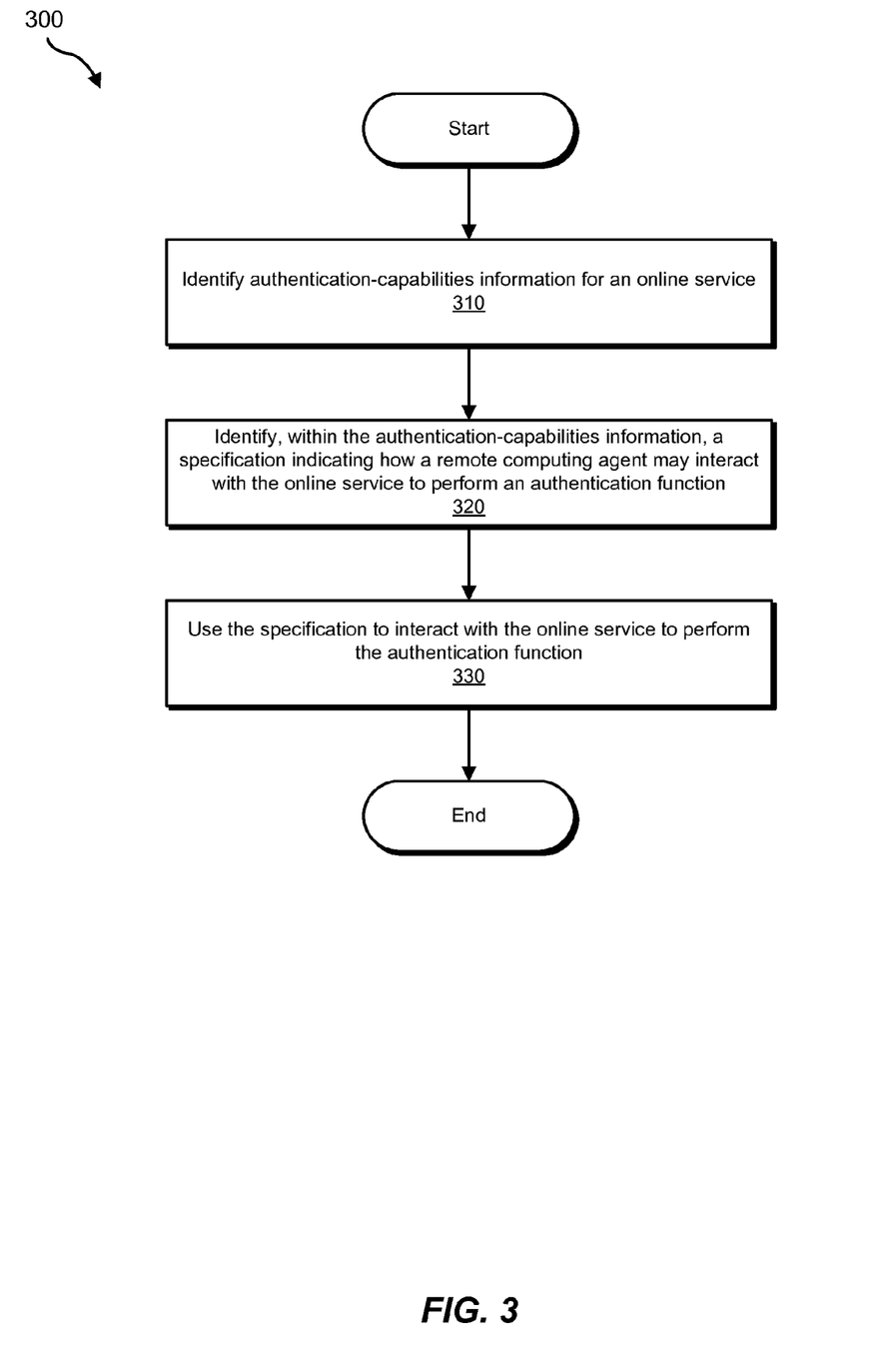
FIG. 3 is a flow diagram of an exemplary method for managing authentication.
Figure 4:
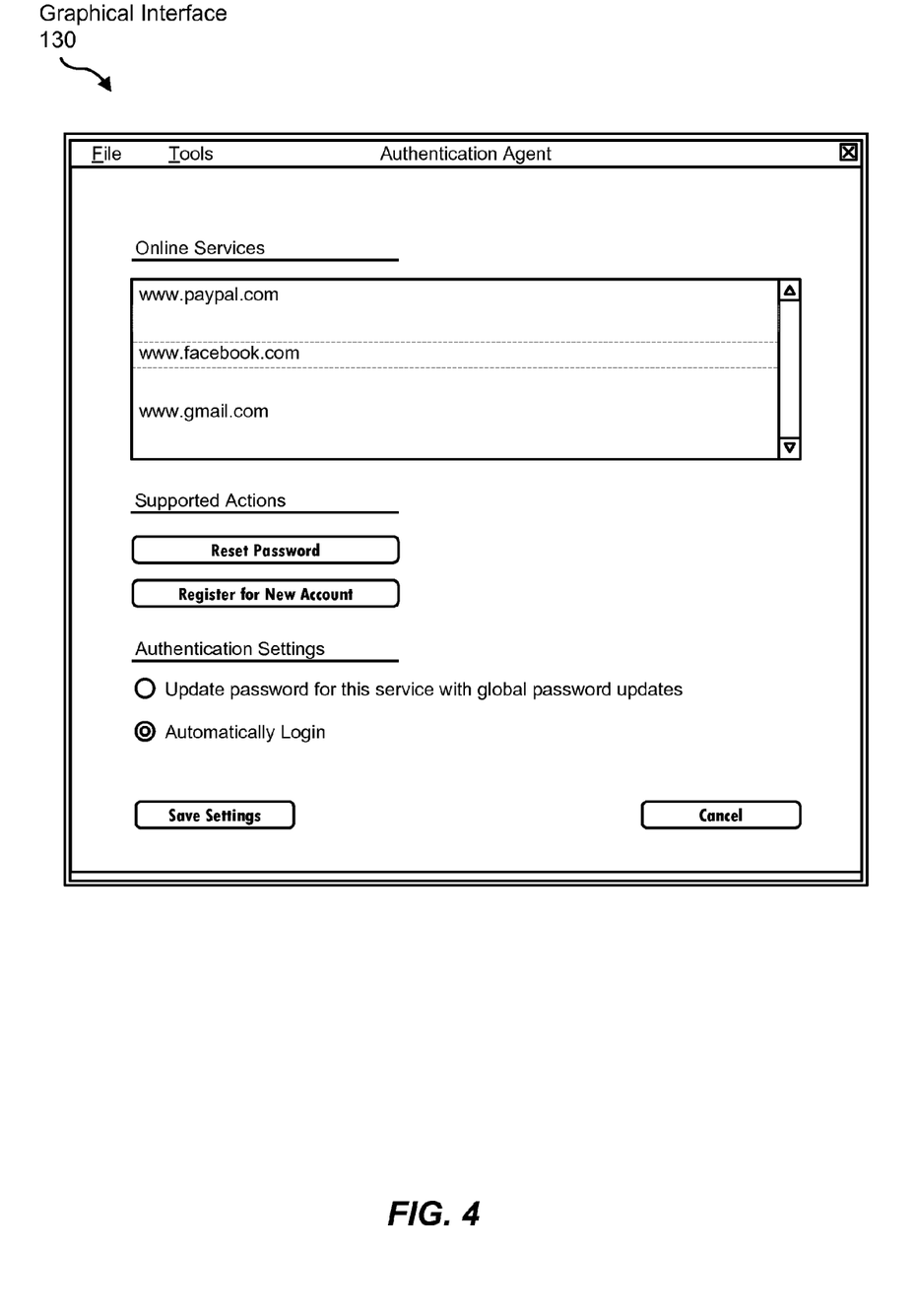
FIG. 4 is a block diagram of an exemplary graphical interface for managing authentication.

FIG. 3 is a flow diagram of an exemplary computer-implemented method 300 for managing authentication. The steps in FIG. 3 may be performed by any suitable computer executable code and/or hardware. For example, at step 310, authentication agent 110 may identify authentication-capabilities information for an online service. As used herein, the phrase "authentication-capabilities information" may refer to any information that may indicate to an authentication agent how the authentication agent may interact with the online service to perform one or more authentication functions supported by the online service. In some embodiments, authentication-capabilities information may be provided in an XML document. The authentication-capabilities information may be provided in any format, including HyperText Markup Language ("HTML") and/or any other structured format.

In some embodiments, authentication-capabilities information for an online service may be provided by an online service provider that provides the online service. Authentication-capabilities information may additionally or alternative be provided by any other suitable source.

Authentication agent 110 may identify authentication-capabilities information for any type or form of online service. Examples of online services include, without limitation, websites (such as online banking websites), web-based e-mail services, instant messaging services, file distribution services, or any other online service. In certain embodiments, an online service may include at least one computing device (such as a server) for providing services to computing devices operated by one or more users of the online service.

Authentication-capabilities information may be identified in any suitable manner. For example, authentication agent 110 may identify authentication-capabilities information for an online service by querying the online service for the authentication-capabilities information. Online service providers may supply authentication-capabilities information at a predefined location. Thus, in some embodiments, authentication agent 110 may be able to find authentication-capabilities information in the same relative location for any online service that provides authentication-capabilities information. For example, a first online service provider may provide authentication-capabilities information at http://www.example1/authinfo1.xml, and a second service provide may provide authentication-capabilities information at http://www.example2/authinfo2.xml.

Authentication-capabilities information may be stored and/or distributed in any other suitable manner. In some embodiments, authentication-capabilities information for one or more online services may be stored in a database, such as a central repository of authentication-capabilities information. According to various embodiments, a resolutions service, such as a Domain Name System ("DNS") service, may provide authentication-capabilities information. For example, an online service provider may provide a Uniform Resource Identifier ("URI") that points to the authentication-capabilities information in a DNS text record for an online service. Authentication agent 110 may query the DNS for the URI and may use the URI to obtain the authentication-capabilities information.

Authentication-capabilities information may be transferred to authentication agent 110 using any suitable protocol. For example, the authentication-capabilities information may be provided via HyperText Transfer Protocol ("HTTP"), secure HTTP ("HTTPS"), File Transfer Protocol ("FTP"), Simple FTP ("SFTP"), Simple Mail Transfer Protocol ("SMTP"), and/or any other communication protocol.

Returning to FIG. 3, at step 320, authentication agent 110 may identify, within the authentication-capabilities information, a specification indicating how a remote computing agent may interact with the online service to perform an authentication function. Authentication agent 110 may identify one or more authentication-function specifications within authentication-capabilities information in any suitable manner. For example, authentication agent 110 may decode the authentication-capabilities into authentication-function data usable by authentication agent 110. In some embodiments, authentication agent 110 may parse the authentication-capabilities information to identify one or more authentication-function specifications.

An authentication-function specification may include any data indicating how a remote agent may perform one or more authentication functions. As used herein, the phrase "authentication function" may refer to any function associated with online service authentication. An authentication function may include creating authentication information (e.g., signing up for a new account), providing authentication information (e.g., signing into an account), changing authentication information (e.g., changing a password), resetting authentication information, disabling an authentication function, changing one or more authentication settings, and/or any other authentication function. The following is an example of authentication-function information in an XML document:

```
<authinfo>
<function>
<class>account_create</class>
<url>http://www.example.com/register.php</url>
<type>web_form</type>
<captcha>yes</captcha>
</function>
<function>
<class>login</class>
<url>http://www.example.com/login.php</url>
<type>web_form</type>
<captcha>no</captcha>
</function>
<function>
<class>password_change</class>
<url>http://www.example.com/accounts/passwordch.php</url>
<type>web_form</type>
<captcha>no</captcha>
</function>
<function>
<class>password_reset</class>
<url>http://www.example.com/account/forgotpassword.php</url>
<type>web_form</type>
<captcha>no</captcha>
</function>
</authinfo>
```

The above example includes specifications for four authentication functions of an online service: a registration function, a login function, a password change function, and a password reset function. The specification for the registration function provides a Uniform Resource Locator ("URL") associated with the function and also indicates that the account creation page includes a web form. The specification for the registration function further indicates that account registration may require a response to a CAPTCHA (i.e., a challenge-response test).

The specification for the login function provides the URL associated with the login function and indicates that the login page includes a web form. The specification for the login function further indicates that no CAPTCHA is required to log into the online service. Similarly, the specifications for the password change function and the password reset function provide the URLs associated with these functions and indicate that the functions may be performed through a web form. The specifications for the password change and password reset functions also indicate that CAPTCHA responses are not needed to perform these functions.

While the preceding example shows four different authentication functions included in authentication-capabilities information, any number of authentication functions may be provided in authentication-capabilities information. Furthermore, specifications of one or more authentication functions may provide any type and amount of information indicating how a remote agent may use the one or more functions to interact with an online service.

Authentication agent 110 may store authentication information received from on online service and/or specification information decoded from the authentication information in a storage device, such as storage device 120. In some embodiments, authentication agent 110 may refresh the stored information periodically (e.g., daily, weekly, monthly) by retrieving the authentication information and storing any changes to the authentication information. Authentication agent 110 may also refresh the stored information before using the information to perform an authentication function.

At step 330, authentication agent 110 may use a specification of an authentication function to interact with an online service to perform an authentication function. For example, authentication agent 110 may log into a user's account at an online service, sign up for an account at the online service, change account settings at the online service, and/or perform any other authentication function.

In some embodiments, authentication agent 110 may use authentication information provided by a user to perform one or more authentication functions. The phrase "authentication information" generally refers to information that may be used to establish or confirm the identity of a device or user. For example, authentication information may include information needed to access a user account of an online service. In some embodiments, authentication information may include user account settings information.

FIG. 4 shows exemplary elements of graphical interface 130. A user may interface with graphical interface 130 to set one or more authentication settings for one or more online services. The user may also interface with graphical interface 130 to perform one or more actions supported by an online service. The following discussion provides an example of how an authentication agent may use authentication-capabilities information from online services to provide a user with authentication management options through graphical interface 130.

Subsystem 210 of FIG. 2 may be a user's computing device, and the user may use subsystem 210 to interface with authentication agent 110 through graphical interface 130. The user may have an account with PAYPAL (e.g., online service 222). The user may also have an account with FACEBOOK (e.g., online service 232) and with GMAIL (e.g., online service 242).

Authentication agent 110 may identify authentication-capabilities information 122(*a*), which may be authentication-capabilities information of PAYPAL. Authentication agent 110 may also identify authentication-capabilities information 122(*b*), which may be authentication-capabilities information of FACEBOOK, and authentication-capabilities information 122(*c*), which may be authentication-capabilities information of GMAIL. Authentication agent 110 may identify authentication information 122(*a*), 122(*b*), and/or 122(*c*) using any of the identification mechanisms presented in the discussion corresponding to step 310 of FIG. 3.

Authentication agent 110 may store the authentication-capabilities information for each of the online services in storage device 120. Authentication agent 110 may also identify one or more authentication-function specifications in each of authentication information 122(*a*), 122(*b*), and 122(*c*). Authentication agent 110 may cause graphical interface 130 to present information that corresponds to the identified functions for each online service. For example, authentication agent 110 may determine that FACEBOOK supports automatic password reset, automatic account registration, automatic login, and password updates. Graphical interface 130 may present a user with options that correspond to these functions. For example, graphical interface 130 may allow a user to input settings that indicate whether the user wants authentication agent 110 to automatically log into FACEBOOK and whether the user wants his or her FACEBOOK password updated when global password updates are applied.

If the user selects the automatic login option, authentication agent 110 may automatically log into FACEBOOK for the user each time the user visits the FACEBOOK website. If the user selects the global password update option, authentication agent 110 may access FACEBOOK (and every other online service for which this option is selected) to change the user's password when global password updates are performed.

Authentication agent 110 may identity authentication functions for PAYPAL and GMAIL, and may also present the user with authentication options associated with these services. The authentication functions supported by PAYPAL and/or GMAIL may be different than the authentication functions provided by FACEBOOK. Thus, authentication agent 110 may cause graphical interface 130 to display different options for these online services.

As shown, authentication agent 110 may offer one or more automatic authentication functions to a user through graphical interface 130. As used herein, the phrase "automatic authentication function" may refer to an authentication function performed by authentication agent 110 rather than by a user.

To perform authentication functions at an online service, in addition to obtaining authentication-capabilities information, authentication agent 110 may obtain authentication information. For example, a user may provide authentication information for one or more online services to authentication agent 110, and authentication agent 110 may store the authentication information in storage device 120 and/or any other storage device. Authentication agent 110 may access the authentication information to perform one or more authentication functions.

Embodiments of the instant disclosure may provide various features and advantages not provided by traditional password manager technologies. For example, if a user wants to change passwords for numerous different online services, the user may direct authentication agent 110 to change passwords for each of these services. Authentication agent 110 may be able to automatically access the user's account for each of the online services and change the user's password for each of the accounts. Thus, the user may not need to go through the time-consuming process of logging into each account individually and changing the password for each account individually. In some embodiments, the process of performing authentication functions for one or more online accounts may be particularly efficient because the functions may be performed based on authentication-capabilities information provided by the online service providers that provide the online accounts.

Figure 5:
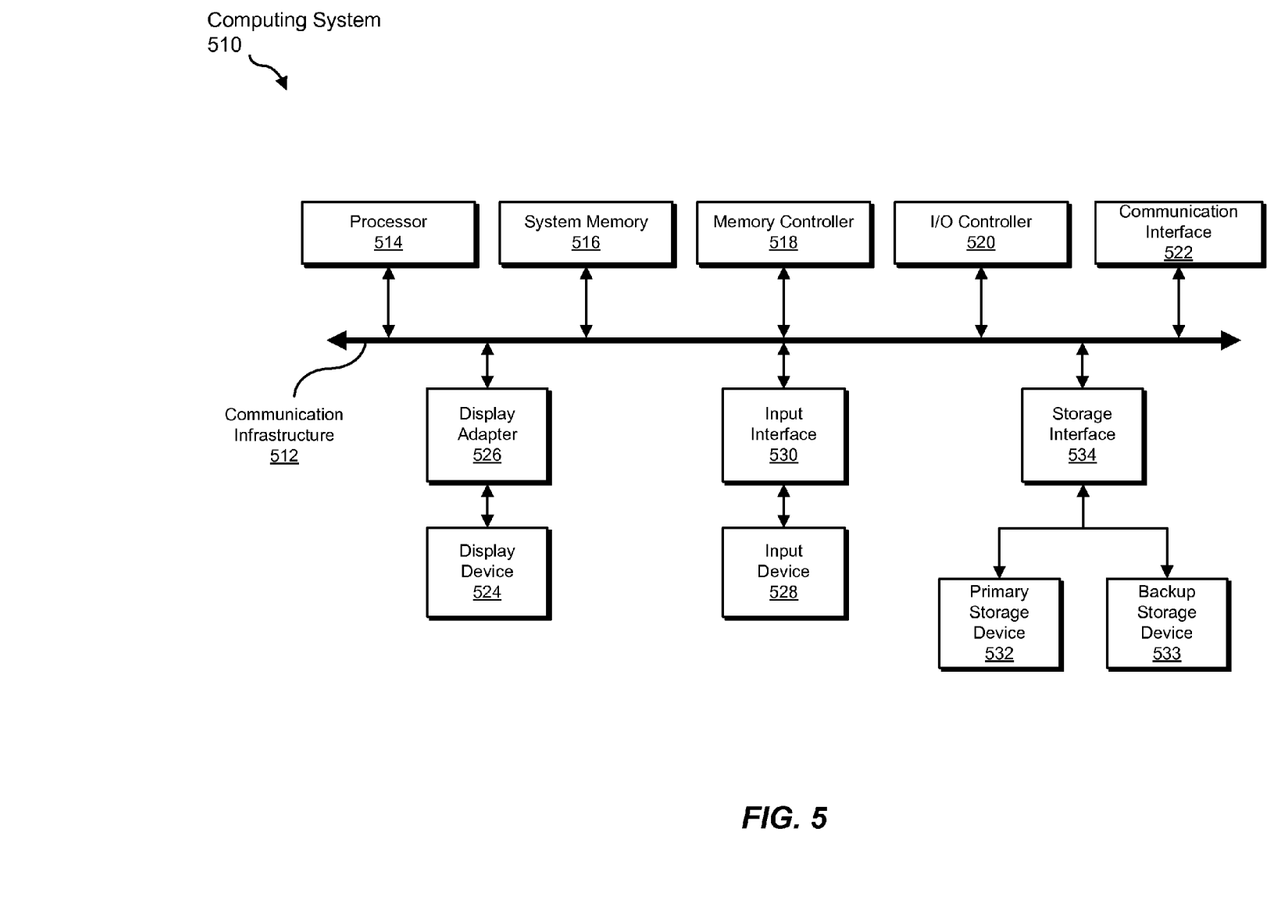
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may comprise at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the managing, identifying, using, querying, receiving, obtaining, decoding, offering, interacting, and refreshing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory ("RAM"), read only memory ("ROM"), flash memory, or any other suitable memory device. Although not required, in certain embodiments computing system 510 may comprise both a volatile memory unit (such as, for example, system memory 516) and a non-volatile storage device (such as, for example, primary storage device 532, as described in detail below).

In certain embodiments, exemplary computing system 510 may also comprise one or more components or elements in addition to processor 514 and system memory 516. For example, as illustrated in FIG. 5, computing system 510 may comprise a memory controller 518, an Input/Output ("I/O") controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as managing, identifying, using, querying, receiving, obtaining, decoding, offering, interacting, and refreshing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the managing, identifying, using, querying, receiving, obtaining, decoding, offering, interacting, and refreshing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network comprising additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 594 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the managing, identifying, using, querying, receiving, obtaining, decoding, offering, interacting, and refreshing steps disclosed herein. Communication interface 522 may also be used to perform and/or be a means for performing other steps and features set forth in the instant disclosure.

As illustrated in FIG. 5, computing system 510 may also comprise at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also comprise at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the managing, identifying, using, querying, receiving, obtaining, decoding, offering, interacting, and refreshing steps disclosed herein. Input device 528 may also be used to perform and/or be a means for performing other steps and features set forth in the instant disclosure.

As illustrated in FIG. 5, exemplary computing system 510 may also comprise a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also comprise other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the managing, identifying, using, querying, receiving, obtaining, decoding, offering, interacting, and refreshing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit ("ASIC") adapted to implement one or more of the exemplary embodiments disclosed herein.

Figure 6:
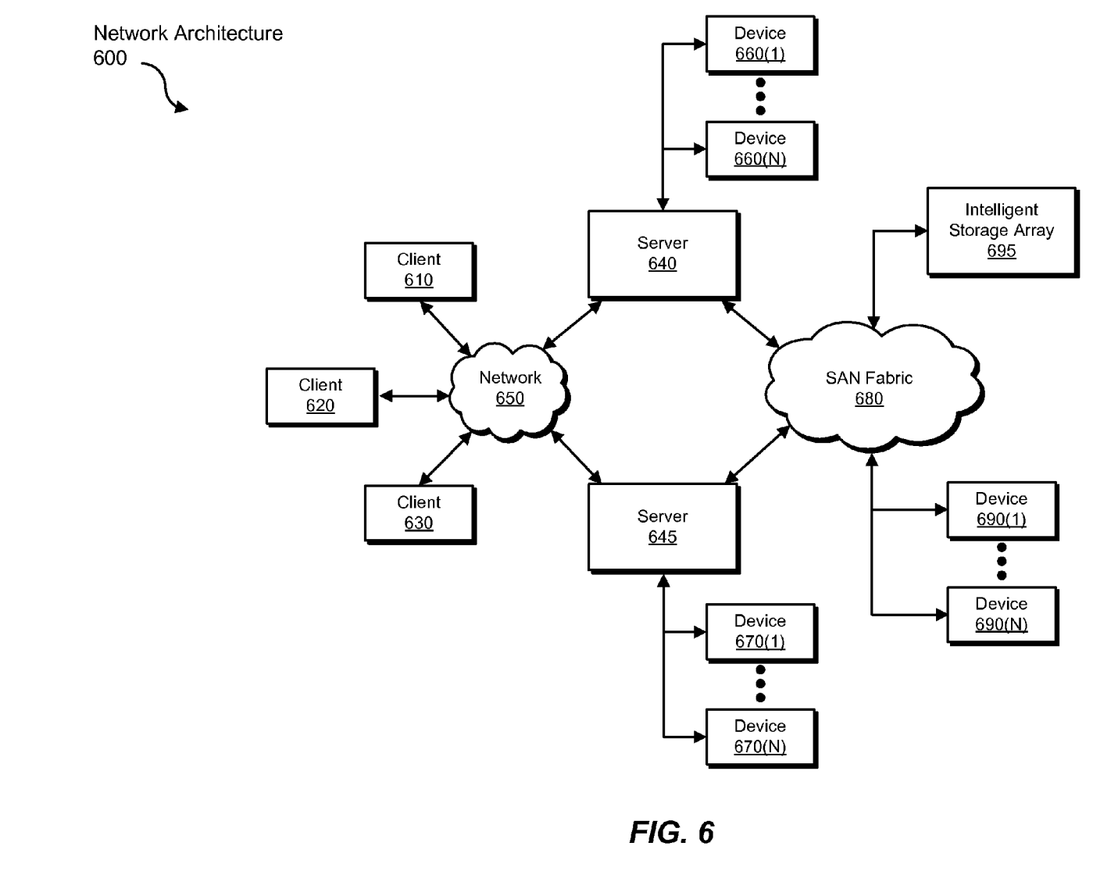
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network ("WAN"), a local area network ("LAN"), a personal area network ("PAN"), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage ("NAS") devices configured to communicate with servers 640 and 645 using various protocols, such as NFS, SMB, or CIFS.

Servers 640 and 645 may also be connected to a storage area network ("SAN") fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the managing, identifying, using, querying, receiving, obtaining, decoding, offering, interacting, and refreshing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for managing authentication. For example, a computing system may identify authentication-capabilities information for an online service. The computing system may also identify, within the authentication-capabilities information, a specification indicating how a remote computing agent may interact with the online service to perform an authentication function supported by the online service. The computing system may further use the specification to interact with the online service to perform the authentication function.

In various embodiments, the computing system may identify the authentication-capabilities information for the online service by querying the online service for the authentication-capabilities information, and by receiving, in response to the query, the authentication-capabilities information from the online service. In certain embodiments, the computing system may identify the authentication-capabilities information for the online service by querying a domain-name system for a uniform-resource identifier associated with the authentication-capabilities information, and by obtaining the authentication-capabilities information from a location indicated by the uniform-resource identifier.

In some embodiments, the computing system may identify the specification within the authentication-capabilities information by decoding the authentication-capabilities information. In certain embodiments, the authentication function may comprise at least one of: an account registration function, a login function, a password change function, and/or a password reset function. In at least one embodiment, the authentication-capabilities information may include an extensible-markup-language document. In some embodiments, the computing system may offer, based on the authentication-capabilities information, one or more automated authentication functions to a user. In some embodiments, the computing system may, before interacting with the online service to perform the authentication function, refresh the authentication-capabilities information.

In certain embodiments, the computing system may include at least one processor. The computing system may also include an authentication agent. The authentication agent may identify authentication-capabilities information for an online service. The authentication agent may also identify, within the authentication-capabilities information, a specification indicating how a remote computing agent may interact with the online service to perform an authentication function supported by the online service. The authentication agent may further use the specification to interact with the online service to perform the authentication function.

In some embodiments, the authentication agent may query the online service for the authentication-capabilities information, and may receive, in response to the query, the authentication-capabilities information from the online service. In other embodiments, the authentication agent may query a domain-name system for a uniform-resource identifier associated with the authentication-capabilities information, and may obtain the authentication-capabilities information from a location indicated by the uniform-resource identifier. In at least one embodiment, the authentication agent may decode the authentication-capabilities information.

In certain embodiments, the authentication function may include at least one of: an account registration function, a login function, a password change function, and/or a password reset function. In various embodiments, the computing system may include a graphical interface that may display one or more automated authentication functions to a user. In some embodiments, the authentication agent may, before interacting with the online service to perform the authentication function, refresh the authentication-capabilities information.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed. One or more of the steps disclosed herein may transform data and/or one or more physical objects. For example, one or more of the steps disclosed herein may transform a configuration of a storage device by modifying data stored on the storage device.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method for managing authentication, at least a portion of the method being performed by a computing system comprising at least one processor, the method comprising:

identifying authentication-capabilities information of an online service by:
querying a predefined location of a provider of the online service for the authentication-capabilities information,
and receiving, from the provider of the online service and in response to the query, the authentication-capabilities information from the online service, wherein the predefined location is in a same relative location where at least one other online service stores information about authentication capabilities;

identifying, within the authentication-capabilities information, a specification indicating an authentication function supported by the online service and indicating how a remote computing agent can interact with the online service to perform the authentication function supported by the online service, wherein the authentication function comprises at least one of a registration function, a log-in function, a password change function, a password reset function, a function for resetting authentication information, a function for disabling authentication, and/or a function for changing an authentication setting;

presenting a user with an option to have the authentication function performed automatically on behalf of the user;

receiving input from the user indicating that the authentication function is to be performed automatically on behalf of the user;

using the specification to interact with the online service to perform the authentication function instead of requiring input from the user to perform the authentication function, wherein using the specification to interact with the online service is performed by the remote computing agent.

2. The method of claim 1, wherein identifying the authentication-capabilities information of the online service comprises:
queryinga domain-name system for a uniform-resource identifier associated with the authentication-capabilities information, wherein the provider of the online service provides the uniform-resource identifier in a domain name system text record for the online service;
obtaining the authentication-capabilities information from a location indicated by the uniform-resource identifier.

3. The method of claim 1, wherein:
the specification indicates a plurality of different authentication functions supported by the online service in an extensible markup language document, the plurality of different authentication functions comprising the authentication function.

4. The method of claim 1, further comprising:
identifying additional authentication-capabilities information of an additional online service;
identifying, within the additional authentication-capabilities information, an additional specification indicating an additional authentication function supported by the additional online service and indicating how the remote computing agent may interact with the additional online service to perform the additional authentication function supported by the additional online service;
presenting the user with an option to have the additional authentication function performed automatically on behalf of the user;
receiving input from the user indicating that the additional authentication function is to be performed automatically on behalf of the user;
using the additional specification to interact with the additional online service to perform the additional authentication function instead of requiring input from the user to perform the additional authentication function, wherein using the additional specification to interact with the additional online service is performed by the remote computing agent.

5. The method of claim 4, wherein the authentication function of the online service is different than the additional authentication function of the additional online service.

6. The method of claim 4, wherein:
the authentication function comprises a function for changing an authentication password of the online service;
the additional authentication function comprises a function for changing an additional authentication password of the additional online service;
the remote computing agent uses the specification and the additional specification to automatically reset passwords for the online service and the additional online service on behalf of the user.

7. The method of claim 1, further comprising:
before interacting with the online service to perform the authentication function, refreshing the authentication-capabilities information by retrieving the authentication information again and storing changes made to the authentication information.

8. A system for managing authentication, the system comprising:
at least one processor;
an authentication agent programmed to cause the at least one processor to:
identify authentication-capabilities information of an online service,
query a predefined location of a provider of the online service for the authentication-capabilities information,
and receive, from the provider of the online service and in response to the query, the authentication-capabilities information from the online service, wherein the predefined location is in a same relative location where at least one other online service stores information about authentication capabilities;
identify, within the authentication-capabilities information, a specification indicating an authentication function supported by the online service and indicating how the authentication agent can interact with the online service to perform the authentication function supported by the online service, wherein the authentication function comprises at least one of a registration function, a log-in function, a password change function, a password reset function, a function for resetting authentication information, a function for disabling authentication, and/or a function for changing an authentication setting;
a graphical interface programmed to:
present a user with an option to have the authentication function performed automatically on behalf of the user;
receive input from the user indicating that the authentication function is to be performed automatically on behalf of the user, wherein the authentication agent is further programmed to use the specification to interact with the online service to perform the authentication function instead of requiring input from the user to perform the authentication function.

9. The system of claim 8, wherein the authentication agent is further programmed to cause the at least one processor to:
query a domain-name system for a uniform-resource identifier associated with the authentication-capabilities information;
obtain the authentication-capabilities information from a location indicated by the uniform-resource identifier.

10. The system of claim 8, wherein the authentication agent is further programmed to cause the at least one processor to:
decode the authentication-capabilities information into authentication-function data usable by the authentication agent.

11. The system of claim 8, wherein the authentication agent is programmed to identify the specification by parsing the authentication-capabilities information.

12. The system of claim 8, wherein the authentication-capabilities information indicates that a challenge-response test is required for the registration function.

13. The system of claim 8, wherein:
the specification indicates a plurality of different authentication functions supported by the online service, the plurality of different authentication functions comprising the authentication function;
the plurality of different authentication functions comprises a function for automatically changing an authentication password for the online service and a function for automatically logging into the online service.

14. The system of claim 8, wherein the authentication agent is further programmed to cause the at least one processor to:

before interacting with the online service to perform the authentication function, refresh the authentication-capabilities information.

15. A non-transitory computer-readable-storage medium comprising one or more computer-executable instructions that, when executed by a computing system, cause the computing system to:
   identify authentication-capabilities information of an online service,
      query a predefined location of a provider of the online service for the authentication-capabilities information,
      and receive, from the provider of the online service and in response to the query, the authentication-capabilities information from the online service, wherein the predefined location is in a same relative location where at least one other online service stores information about authentication capabilities;
   identify, within the authentication-capabilities information, a specification indicating an authentication function supported by the online service and indicating how a remote computing agent can interact with the online service to perform the authentication function supported by the online service, wherein the authentication function comprises at least one of a registration function, a log-in function, a password change function, a password reset function, a function for resetting authentication information, a function for disabling authentication, and/or a function for changing an authentication setting;
   present a user with an option to have the authentication function performed automatically on behalf of the user;
   receive input from the user indicating that the authentication function is to be performed automatically on behalf of the user;
   use the specification to interact with the online service to perform the authentication function instead of requiring input from the user to perform the authentication function.

16. The non-transitory computer-readable-storage medium of claim 15, wherein the one or more computer-executable instructions are programmed to cause the computing system to:
   before interacting with the online service to perform the authentication function, refresh the authentication-capabilities information by retrieving the authentication information again and storing changes to the authentication information.

17. The non-transitory computer-readable-storage medium of claim 15, wherein the specification indicates that the authentication function is performed through a web form.

* * * * *